(12) United States Patent
Morhenn et al.

(10) Patent No.: US 7,751,798 B2
(45) Date of Patent: Jul. 6, 2010

(54) METHOD AND COMPUTER-READABLE MEDIUM HAVING A PROGRAM FOR MANAGING BILLING FOR A TELECOMMUNICATIONS CAMPUS BY ASSIGNING DIFFERENT BILLING RATES INSIDE THE CAMPUS

(75) Inventors: Eric Morhenn, Bethesda, MD (US); Justin Wolf, Centreville, VA (US)

(73) Assignee: Nextel Communications Inc., Reston, VA (US)

( * ) Notice: Subject to any disclaimer, the term of this patent is extended or adjusted under 35 U.S.C. 154(b) by 509 days.

(21) Appl. No.: 11/236,565

(22) Filed: Sep. 28, 2005

(65) Prior Publication Data

US 2007/0072586 A1     Mar. 29, 2007

(51) Int. Cl.
*H04M 11/00*     (2006.01)
*H04W 24/00*     (2009.01)

(52) U.S. Cl. .................................. 455/406; 455/456.1

(58) Field of Classification Search ... 455/456.1–456.6, 455/406

See application file for complete search history.

(56) References Cited

U.S. PATENT DOCUMENTS

| | | | |
|---|---|---|---|
| 6,424,840 B1 * | 7/2002 | Fitch et al. | 455/456.1 |
| 6,993,319 B2 * | 1/2006 | Himmel et al. | 455/406 |
| 2005/0086164 A1 * | 4/2005 | Kim et al. | 705/40 |

* cited by examiner

*Primary Examiner*—George Eng
*Assistant Examiner*—Michael Faragalla

(57) ABSTRACT

Method and computer-readable medium for managing billing for calls within a user's telecommunications campus. According to the method and computer-readable medium for managing billing for calls within a user's campus, users can make unlimited calls within the campus by determining whether a call from a user begins in a predetermined area of use; determining whether the user is on a predetermined list of users, if the call began in the predetermined area of use; assigning a first billing rate to the call, if the predetermined list of users includes the user; and assigning a second billing rate to the call, if the predetermined list of users does not include the user.

23 Claims, 3 Drawing Sheets

METHOD AND COMPUTER-READABLE MEDIUM HAVING A PROGRAM FOR MANAGING BILLING FOR A TELECOMMUNICATIONS CAMPUS BY ASSIGNING DIFFERENT BILLING RATES INSIDE THE CAMPUS

BACKGROUND OF THE INVENTION

Businesses have come to rely on wireless communications as an essential tool. Many companies rely on wireless communications to make their employees available both away from the office and while working on their campus, i.e., a predetermined area of use. However, businesses are concerned with the costs of wireless communications due to employees' personal use.

Businesses have tried various techniques to address the problem of employees' personal use of wireless communications. One technique is to deploy private wireless networks across a campus, where such networks operate using protocols not used in wireless macro networks, such as Voice over IP (VoIP) using 802.11 protocols. Because mobile stations will only operate on the private wireless network, businesses can avoid paying wireless macro network operators for employees' personal use. However, this technique would require employees who need to be available while located outside of the campus to carry a mobile station that is compatible with the wireless macro network. For these employees, there will still be a problem of personal use. Additionally, 802.11 protocols have security and quality of service issues that make them unsuitable for some enterprise and government applications.

Another technique is to use a wireless macro network operator that provides free mobile to mobile calls. While this may reduce costs for calls between employees using mobile stations, it does not reduce costs for calls between the mobile stations and other communication stations, and it does not address the costs of employees' personal use.

A third technique is for the business to reimburse employees for a certain portion of their wireless communication costs. However, this is inconvenient for the employees, who must submit reimbursement requests on a monthly basis.

SUMMARY OF THE INVENTION

In view of the above-identified and other deficiencies of conventional telecommunications systems, the present invention provides a method and computer-readable medium for managing billing for calls within a user's campus. Specifically, the present invention provides methods and computer-readable media for managing billing for calls within a user's campus, such that users have unlimited calls within the campus and to communications terminals outside the campus for a fixed monthly fee. This type of billing arrangement is referred to below as a campus calling plan.

In accordance with an exemplary embodiment of the present invention, a method for managing billing for calls in a network includes: determining whether a call from a user begins in a predetermined area of use; determining whether the user is on a predetermined list of users, if the call began in the predetermined area of use; assigning a first billing rate to the call, if the predetermined list of users includes the user; and assigning a second billing rate to the call, if the predetermined list of users does not include the user.

In accordance with another exemplary embodiment of the present invention, there is a computer-readable medium encoded with a computer program for managing billing for calls in a network, the computer program including instructions for: determining whether a call from a user begins in a predetermined area of use; determining whether the user is on a predetermined list of users, if the call began in the predetermined area of use; assigning a first billing rate to the call, if the predetermined list of users includes the user; and assigning a second billing rate to the call, if the predetermined list of users does not include the user.

Other objects, advantages and novel features of the present invention will become apparent from the following detailed description of the invention when considered in conjunction with the accompanying drawings.

DETAILED DESCRIPTION OF THE EXEMPLARY EMBODIMENTS

Figure 1:
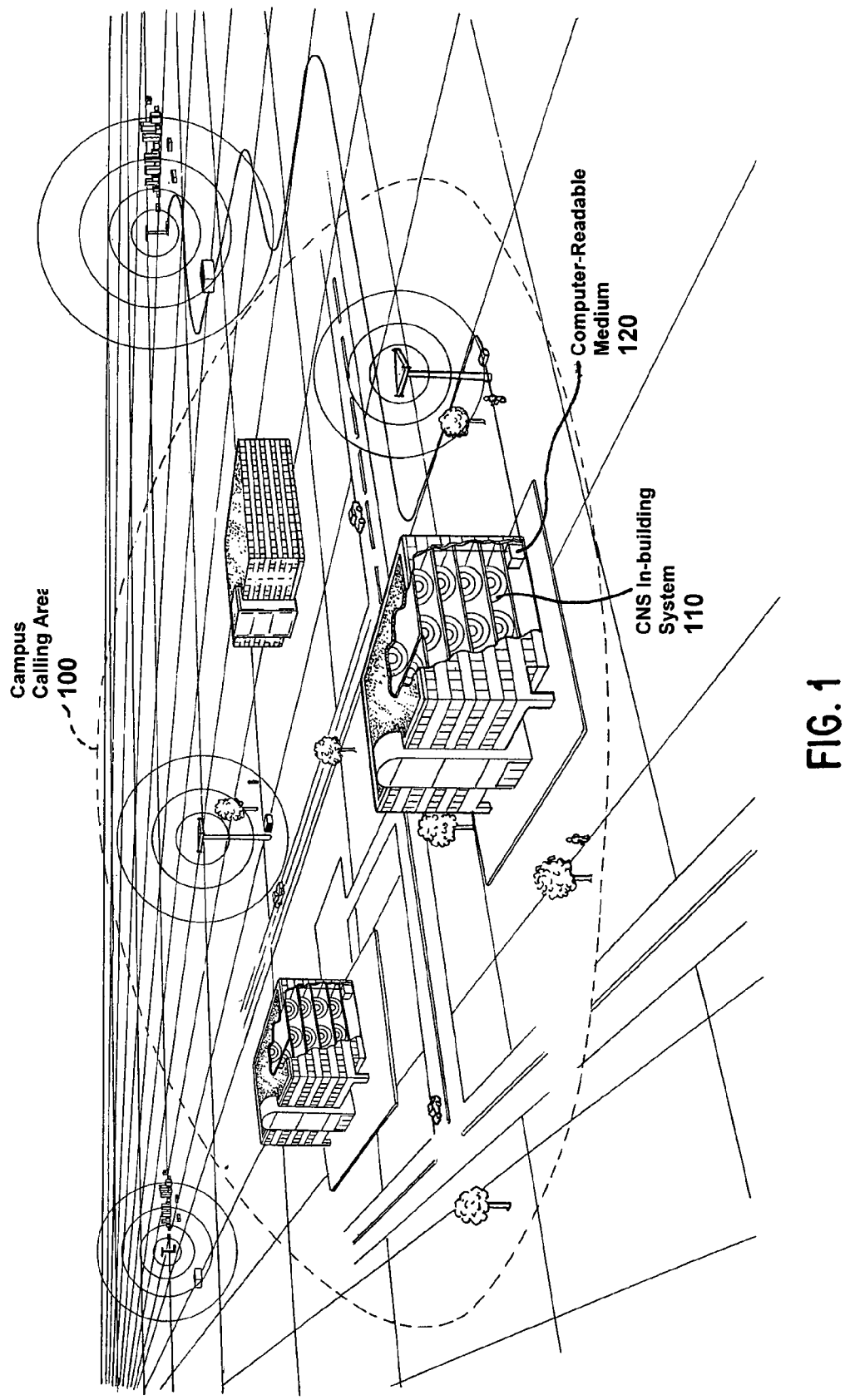
FIG. 1 illustrates an example of a campus calling area, according to the present invention.

In accordance with exemplary embodiments of the present invention, a definition of a geographic campus and the cell towers and in-building sites that serve it are defined. FIG. 1 illustrates a campus calling area 100 in accordance with the present invention. As illustrated in FIG. 1, one or more buildings can be included in the campus calling area 100. Each of the buildings may have a telecommunications network referred to as a Custom Network Solution (CNS) in-building system 110. A unique billing code is established for the Personal Telephone Numbers (PTNs) of a group of users (customers) who work on the campus 100. The customers have unlimited calls while on the campus 100 for a flat monthly fee. Using flat rate billing for unlimited calls allows for predictable wireless bills for the customer.

Figure 2:
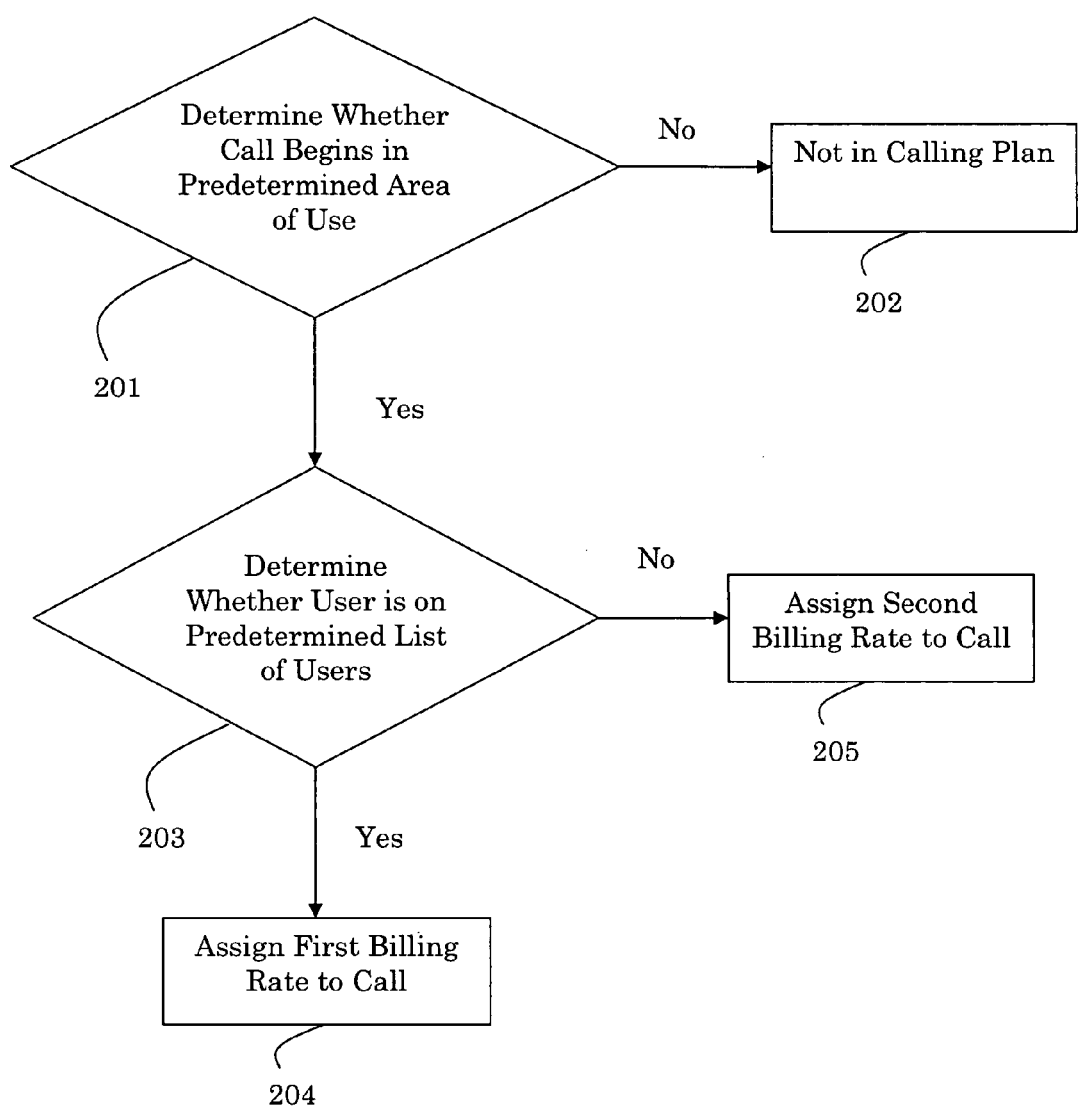
FIG. 2 illustrates an exemplary method for managing billing for calls in a campus, in accordance with the present invention.
Figure 3:
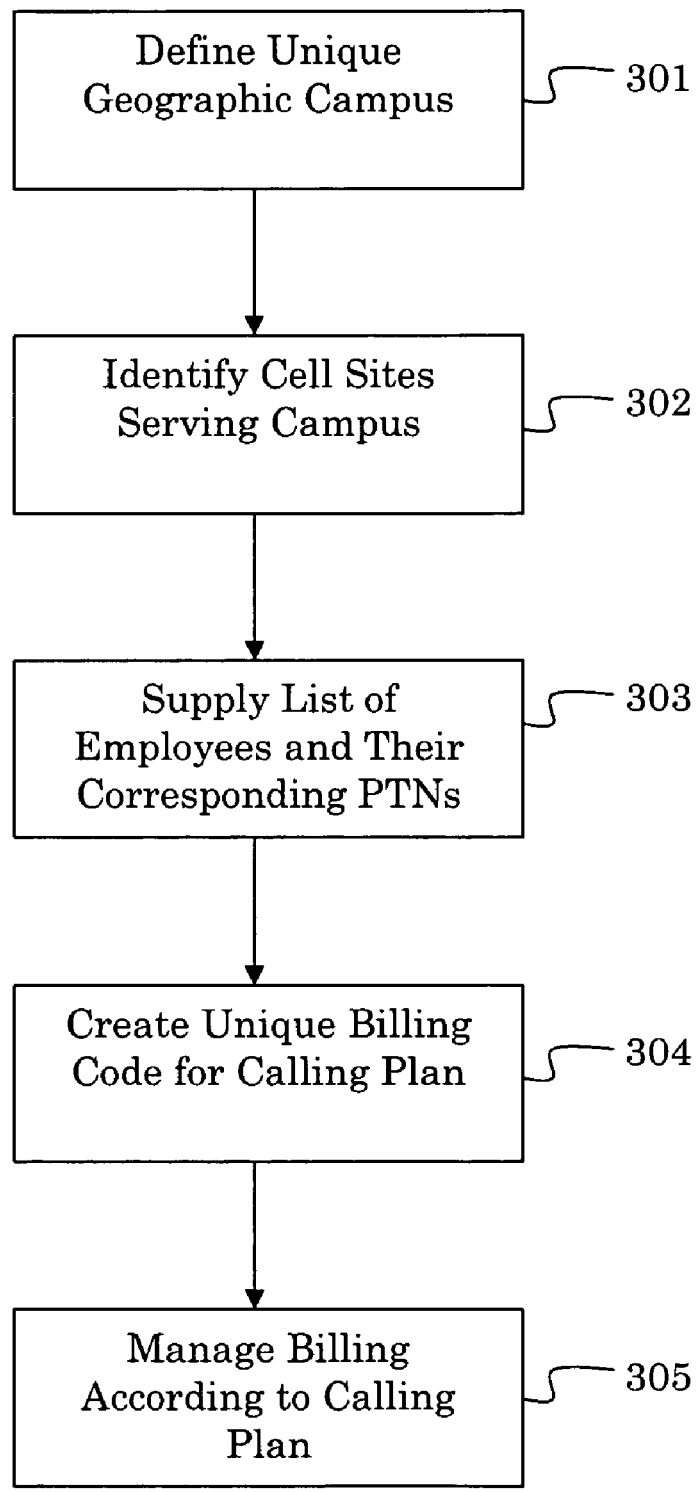
FIG. 3 illustrates an exemplary method for preparing and managing billing in a unique geographic campus.

FIG. 3 illustrates an exemplary method for preparing and managing billing in a unique geographic campus. Working with the customer, a unique geographic campus 100 is defined (step 301). This could be a university, manufacturing facility, hotel, etc. Telecommunications engineers identify the cell sites serving that campus 100 (step 302), which could be macro towers or specialized in-building antenna systems. The customer supplies a list of the employees he would like placed on the campus calling plan, and their corresponding PTNs (e.g., cell phone numbers) are identified (step 303). A unique billing code is created for the campus calling plan (step 304). Then, the billing for the unique geographic campus is managed (step 305), as illustrated in FIG. 2, for example. When a subscriber places a call from the campus 100, that PTN may be cross-referenced with the pre-set list of campus calling plan subscribers. If he is not on the list, the subscriber may be billed at his normal rate plan. If the subscriber is on the campus calling plan list, his call can be 'zero rated', meaning the length of time of the call is not deducted from an allotment of minutes allotted to the subscriber, since that subscriber has unlimited calling while on campus 100. Campus calling plan subscribers may pay a flat monthly fee for an unlimited number of call minutes while on the campus 100. Within the campus, subscribers' calls can be zero-rated, whether the calls are made to or from a mobile station of one cellular provider, a mobile station of another cellular provider, or landline phones.

In the case where a subscriber starts a call off campus and ends a call on campus (e.g., driving to work), the originating cell site determines how the call will be billed. For instance, any call started on campus and terminated off campus can be zero-rated and be part the campus calling plan. Campus calling plans may include unlimited cellular calls, free long distance calling, and unlimited dispatch calls, such as Nextel's Direct Connect service. However, if desired, dispatch calls are not tracked in any special manner. Campus calling plans are intended to work with existing phones, so that the customer does not need to change any settings on the phone or load any software onto the phone to take advantage of the campus calling plans.

In an exemplary embodiment of the invention illustrated in FIG. 2, a method for managing billing for calls in a network, includes: determining whether a call from a user begins in a predetermined area of use (step 201); determining whether the user is on a predetermined list of users, if the call began in the predetermined area of use (step 203); assigning a first billing rate to the call, if the predetermined list of users includes the user (step 204); and assigning a second billing rate to the call, if the predetermined list of users does not include the user (step 205). The determination of whether the call began in the predetermined area of use may include a determination of whether the call was transmitted from, or received in, the predetermined area of use. Here, the determination of whether the user is on the predetermined list of users may include cross-referencing a user identifier of the user with the predetermined list of users. The user identifier may be a PTN. If it is determined in step 201 that the call did not begin in the predetermined area of use, then the call is categorized as not being in the campus calling plan (step 202).

As an alternative to, or in addition to, determining the geographic campus using cell towers, Global Positioning Satellite (GPS) location can be used to determine whether a user is on or off campus. If the user leaves/enters the campus, a message can be sent to the user to inform him that he has left/entered the campus, thereby notifying the user of a possible change in billing.

In another exemplary embodiment, when the first billing rate is assigned to the call, an amount of time available in a user's calling plan is not reduced by the time used for the call. In other words, the call is zero-rated, such that there is no cost to the user for the call.

In yet another exemplary embodiment of the method of the present invention, if the user makes a call off the user's campus 100, the call is billed directly to the user's personal calling plan. By contrast, calls made by the user in the campus 100 are billed to the user's business calling plan, i.e., to the user's employer. This type of billing arrangement is known as split billing. Such an arrangement allows users to make personal calls without billing their employers for the personal calls, thereby simplifying the billing.

In still another exemplary embodiment of the method for managing billing, users of one group are permitted to make unlimited calls in the campus of another group of users, as well as in their own campus. For example, users from one telecommunications campus of a company that has campus calling plans for more than one campus can make unlimited calls in their own campus and in one or more other campuses used by the company. This type of billing plan is called multi-campus roaming. Under a multi-campus roaming arrangement, the predetermined list of users for one campus may include the users normally associated with another campus, thereby allowing the users to make unlimited calls when on either campus.

In an exemplary embodiment of the present invention, as illustrated in FIG. 1, there is a computer-readable medium 120 encoded with a computer program for managing billing for calls in a network. The term "computer-readable medium" as used herein refers to any medium that participates in providing instructions for execution. Such a medium may take many forms, including but not limited to, non-volatile media, volatile media, and transmission media. Non-volatile media includes, for example, optical or magnetic disks. Volatile media includes, for example, dynamic memory. Transmission media includes coaxial cables, copper wire and fiber optics.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, or any other medium from which a computer can read.

Although the computer-readable medium is illustrated as being disposed in the CNS In-building system 110, the present invention is not limited to such an arrangement. The computer program includes instructions for the method described above in relation to FIG. 2.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for managing billing for calls in a network, comprising the acts of:
   determining whether a call from a user begins in a predetermined area of use;
   determining whether the user is on a predetermined list of users, when the call began in the predetermined area of use;
   assigning a first billing rate to the call, based on the predetermined list of users including the user and the call beginning in the predetermined area of use; and
   assigning a second billing rate to the call, based on the predetermined list of users not including the user and the call beginning in the predetermined area of use;
   wherein the first billing rate is assigned to the entire call, when the predetermined list of users includes the user, even when the user leaves the predetermined area of use during the call; and
   wherein the second billing rate is assigned to the entire call, when the predetermined list of users does not include the user.

2. The method of claim 1, wherein determining whether the user is on the predetermined list of users comprises cross-referencing a user identifier of the user with the predetermined list of users.

3. The method of claim 2, wherein the user identifier comprises a personal telephone number of the user.

4. The method of claim 1, wherein, when the first billing rate is assigned to the call, an amount of time available in a user's calling plan is not reduced by the time used for the call.

5. The method of claim 1, wherein the first billing rate comprises no cost to the user for the call.

6. The method of claim 1, wherein the call comprises a cellular call.

7. The method of claim 1, wherein the predetermined area of use comprises a telecommunications campus.

8. The method of claim 1, wherein, when the call begins outside of the predetermined area of use, the call is billed to a personal calling plan of the user.

9. The method of claim 1, wherein the predetermined list of users includes users from another predetermined area of use.

10. The method of claim 1, further comprising determining a location of the user using a global positioning system (GPS) signal.

11. The method of claim 1, further comprising sending a message to the user if the user enters or leaves the predetermined area of use.

12. The method of claim 1, wherein the act of determining whether the call from the user begins in the predetermined area of use comprises determining whether the call was transmitted from or received in the predetermined area of use.

13. A non-transitory computer-readable medium encoded with a computer program for managing billing for calls in a network, the computer program comprising instructions for:
   determining whether a call from a user begins in a predetermined area of use;
   determining whether the user is on a predetermined list of users, when the call began in the predetermined area of use;
   assigning a first billing rate to the call, based on the predetermined list of users including the user and the call beginning in the predetermined area of use; and
   assigning a second billing rate to the call, based on the predetermined list of users not including the user and the call beginning in the predetermined area of use;
   wherein the first billing rate is assigned to the entire call, when the predetermined list of users includes the user, even when the user leaves the predetermined area of use during the call; and
   wherein the second billing rate is assigned to the entire call, when the predetermined list of users does not include the user.

14. The computer-readable medium of claim 13, wherein determining whether the user is on the predetermined list of users comprises cross-referencing a user identifier of the user with the predetermined list of users.

15. The computer-readable medium of claim 14, wherein the user identifier comprises a personal telephone number of the user.

16. The computer-readable medium of claim 13, wherein, when the second billing rate is assigned to the call, an amount of time available in a user's calling plan is not reduced by the time used for the call.

17. The computer-readable medium of claim 13, wherein the first billing rate comprises no cost to the user for the call.

18. The computer-readable medium of claim 13, wherein the call comprises a cellular call.

19. The computer-readable medium of claim 13, wherein, when the call begins outside of the predetermined area of use, the call is billed to a personal calling plan of the user.

20. The computer-readable medium of claim 13, wherein the predetermined list of users includes users from another predetermined area of use.

21. The computer-readable medium of claim 13, wherein the computer program further comprises an instruction for determining a location of the user using a global positioning system (GPS) signal.

22. The computer-readable medium of claim 13, wherein the computer program further comprises an instruction for sending a message to the user if the user enters or leaves the predetermined area of use.

23. The computer-readable medium of claim 13, wherein the instruction for determining whether the call from the user begins in the predetermined area of use comprises determining whether the call was transmitted from or received in the predetermined area of use.

* * * * *